(12) United States Patent
Qin et al.

(10) Patent No.: US 12,174,395 B2
(45) Date of Patent: Dec. 24, 2024

(54) HEAD MOUNTED DISPLAY WITH LIGHTGUIDE AND MULTIPLE COMBINERS

(71) Applicant: GOOGLE LLC, Mountain View, CA (US)

(72) Inventors: Yi Qin, Mountain View, CA (US); Ozan Cakmakci, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 641 days.

(21) Appl. No.: 17/431,986

(22) PCT Filed: Dec. 4, 2019

(86) PCT No.: PCT/US2019/064406
§ 371 (c)(1),
(2) Date: Aug. 18, 2021

(87) PCT Pub. No.: WO2020/256769
PCT Pub. Date: Dec. 24, 2020

(65) Prior Publication Data
US 2022/0121034 A1 Apr. 21, 2022

Related U.S. Application Data

(60) Provisional application No. 62/863,549, filed on Jun. 19, 2019.

(51) Int. Cl.
*G02B 27/00* (2006.01)
*G02B 5/04* (2006.01)
(Continued)

(52) U.S. Cl.
CPC ............. *G02B 27/283* (2013.01); *G02B 5/04* (2013.01); *G02B 27/0172* (2013.01); *G02F 1/31* (2013.01);
(Continued)

(58) Field of Classification Search
CPC .... G02B 27/283; G02B 5/04; G02B 27/0172; G02B 2027/0127; G02B 2027/0132;
(Continued)

(56) References Cited

U.S. PATENT DOCUMENTS 9,581,820 B2 2/2017 Robbins
9,939,647 B2 4/2018 Vallius et al.
(Continued)

FOREIGN PATENT DOCUMENTS

JP 2015226110 A 12/2015
WO 2017142774 A1 8/2017

OTHER PUBLICATIONS

Translation of Chinese Office Action mailed Jan. 20, 2023 for CN Application No. 201980093968.4, 27 pages.
International Preliminary Report on Patentability mailed Dec. 30, 2021 for International Application No. PCT/US2019/064406, 7 pages.
International Search Report and Written Opinion mailed Mar. 11, 2020 for corresponding International Application No. PCT/US2019/064406, 11 pages.
(Continued)

*Primary Examiner* — Henry Duong (57) ABSTRACT

A head mounted display (HMD) provides multiple fields of view of a single micro-display by time-multiplexing the provision of light of different polarizations. The HMD includes a micro-display, a lightguide, and a plurality of combiners coupled to the lightguide, wherein each combiner is configured to combine light of a different polarization. For example, the HMD can include two combiners, with one combiner configured to combine P-polarized light and the other combiner configured to combine S-polarized light. A polarizer switch is included in a filter stack for the lightguide, and a control module controls the switch to alternate the provision of light having P-polarization and S-polarization, respectively. The light of each polarization provides a different field of view of the micro-display.

19 Claims, 4 Drawing Sheets

(51) Int. Cl.
  *G02B 27/01* (2006.01)
  *G02B 27/28* (2006.01)
  *G02F 1/31* (2006.01)

(52) U.S. Cl.
  CPC ............... *G02B 2027/0127* (2013.01); *G02B 2027/0132* (2013.01); *G02B 2027/0178* (2013.01)

(58) Field of Classification Search
  CPC .... G02B 2027/0178; G02B 2027/0125; G02B 2027/0134; G02B 5/045; G02F 1/31; G02F 1/29; G02F 1/292; G02F 1/2955; G02F 1/313
  USPC .......................................................... 359/320
  See application file for complete search history.

(56) References Cited

U.S. PATENT DOCUMENTS

| | | |
|---|---|---|
| 2017/0242249 A1* | 8/2017 | Wall ..................... G02B 6/0016 |
| 2017/0307886 A1 | 10/2017 | Stenberg et al. |
| 2018/0113309 A1* | 4/2018 | Robbins ............... H04N 13/337 |
| 2018/0188258 A1 | 7/2018 | Browy et al. |
| 2018/0188528 A1* | 7/2018 | Browy ............... G02B 27/0081 |
| 2019/0155032 A1 | 5/2019 | Vallius et al. |

OTHER PUBLICATIONS

Translation of Notification for Patent Registration Formalities mailed Aug. 23, 2023 for CN Application No. 201980093968.4, 6 pages.
European Notice of Allowance mailed Jul. 6, 2023 for European Application No. 19829379.7, 26 pages.

\* cited by examiner

HEAD MOUNTED DISPLAY WITH LIGHTGUIDE AND MULTIPLE COMBINERS

CROSS-REFERENCE TO RELATED APPLICATIONS

The present application is a U.S. National Stage under 35 U.S.C. § 371 of International Patent Application Serial No. PCT/US2019/064406, entitled "HEAD MOUNTED DISPLAY WITH LIGHTGUIDE AND MULTIPLE COMBINERS" and filed on Dec. 4, 2019, which claims priority to U.S. Provisional Application No. 62/863,549, filed on Jun. 19, 2019, the entireties of which are incorporated by reference herein.

BACKGROUND

Head mounted display (HMD) systems provide a way to visually immerse a user in a virtual reality (VR) or augmented reality (AR) environment, or to display other content to a user in a convenient way. Some HMD systems include a micro-display that emits an image via a set of light rays. The light rays are coupled into a lightguide of the HMD and bounce repeatedly from a world side surface of the lightguide before entering the eye of the user. However, conventional HMD systems have limitations that can negatively impact the viewer experience. For example, some HMD systems can only display images having a single focal plane, limiting the immersiveness and flexibility of the displayed images. Other HMD systems include mechanisms to generate images at different focal planes, such as multiple micro-displays, mechanisms to mechanically adjust portions of the HMD, and the like, but these systems have other limitations, including large form factors and high cost.

SUMMARY

The proposed solution relates to systems and techniques for providing multiple fields of view of a single micro-display of an HMD the provision of light of different polarizations. The HMD includes a micro-display, a lightguide, and a plurality of combiners coupled to the lightguide, wherein each combiner is configured to combine light of a different polarization, e.g., by time-multiplexing. The light of each polarization provides a different field of view of the micro-display. For example, the HMD can include two combiners, with one combiner configured to combine P-polarized light and the other combiner configured to combine S-polarized light. For example, a polarizer switch may be included in a filter stack for the lightguide, and a control module may control the switch to alternate the provision of light having P-polarization and S-polarization, respectively.

The different fields of view can be employed to support a variety of uses and applications. For example, in some embodiments, the HMD presents the different fields of view in a "stitched" format, effectively presenting a larger overall field of view of the micro-display. In other embodiments, the HMD presents the different fields of view in a separated format, wherein there is a gap between the different fields of view. In some applications, the separated fields of view can be used to display objects at different image planes, increasing the immersiveness of VR and AR content. In other applications, the separated fields of view can present different types of information to a user, such as presenting email in one field and notification information in another field. The information presented at the different fields of view can be user programmable, improving the flexibility of the HMD.

In an exemplary embodiment, the plurality of combiners may, as stated above, include a first combiner to combine P-polarized light and a second combiner to combine S-polarized light.

Additionally or alternatively, the HMD may further comprise a switch to provide light of different polarizations to the lightguide. The switch may, for example, be configured to pass light of a specified based on a state of a received control signal. This may include that the received control signal is a voltage provided by a controller of the HMD. In one exemplary embodiment, the switch may be configured to alternate provision of P-polarized light emitted from the micro-display with provision of S-polarized light emitted from the micro-display and the first and second combiners may be configured to provide the light of the corresponding polarization from the lightguide to user's pupil.

In an exemplary embodiment, the switch may comprise a liquid crystal display (LCD) switch, in particular an LCD cell.

In an exemplary embodiment, the HMD may further comprise a controller to control the switch to time-multiplex the provision of lights of different polarizations to the lightguide.

In an exemplary embodiment, the HMD may comprise an angle filter coupled to the switch. For example, the angle filter may be disposed between the switch and a prism of the HMD configured to couple light rays generated by the micro-display into the lightguide. Additionally or alternatively, the angle filter may implement at least two prisms being configured to reject light at predetermined, e.g., high, angles by total reflection.

In one exemplary embodiment, the plurality of combiners may be arranged to present a stitched field of view based on the multiple fields of view or to present a split field of view based on the multiple fields of view.

The HMD may comprise a controller configured to position the plurality of combiners to set the relative positions of the multiple fields of view. For example, the position of the plurality of combiners may be user programmable.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate systems and techniques for providing multiple fields of view of a single micro-display of an HMD by time-multiplexing the provision of light of different polarizations. The HMD includes a micro-display, a lightguide, and a plurality of combiners coupled to the lightguide, wherein each combiner is configured to combine light of a different polarization.

Figure 1:
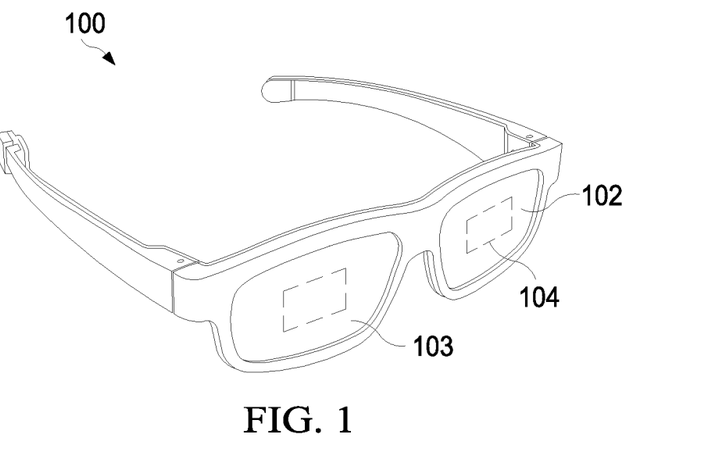
FIG. 1 is a diagram of an HMD system including a lightguide with multiple combiners to generate multiple fields of view from a common micro-display in accordance with some embodiments.

FIG. 1 illustrates an HMD 100 in accordance with some embodiments. In the depicted example the HMD 100 has an eyeglass form factor and includes two see-through eyepieces 102 and 103 that each provide image light to a user in a viewing region (e.g. viewing region 104) along with a view of the surrounding environment. The image light may be augmented reality data that provides information of one or more objects in the surrounding environment. Additionally, the image light provides other information to the user such as text messages, email messages, phone call information, etc.

The HMD 100 includes electronics and a micro-display (not shown at FIG. 1) to project the image light to the user. The electronics are either coupled to a secondary electronics device, such as a computer or cell phone, that provides the data for generating the image light, or the electronics include wireless communication technology that allows for the receipt of the information via a wireless network, such as Bluetooth, Wi-Fi or cellular.

As described further below, each eyepiece includes a lightguide that provides an optical pathway for the image light to propagate from the micro-display to the image light viewing region 104, which is arranged to be aligned with the user's eye. The lightguide relies on total internal reflection (TIR) for propagating the image light from an input coupler to an output coupler, which redirects the light out of the HMD 100 and toward the eye of the user in the image light viewing region. The eyepieces may additionally include vision correction lensing for the user or absorbing sunglass coatings.

In at least one embodiment, the lightguide is coupled to additional components to support presentation of multiple fields of view at the image viewing region 104, including a filter stack having a polarizer switch and a plurality of combiners. The polarizer switch is configured to time-multiplex the provision of light of different polarizations from the micro-display to the lightguide. Each of the plurality of combiners combines the light having a corresponding polarization and provides the combined light to the image viewing region 104, thereby presenting multiple fields of view of the micro-display to the user.

Figure 2:
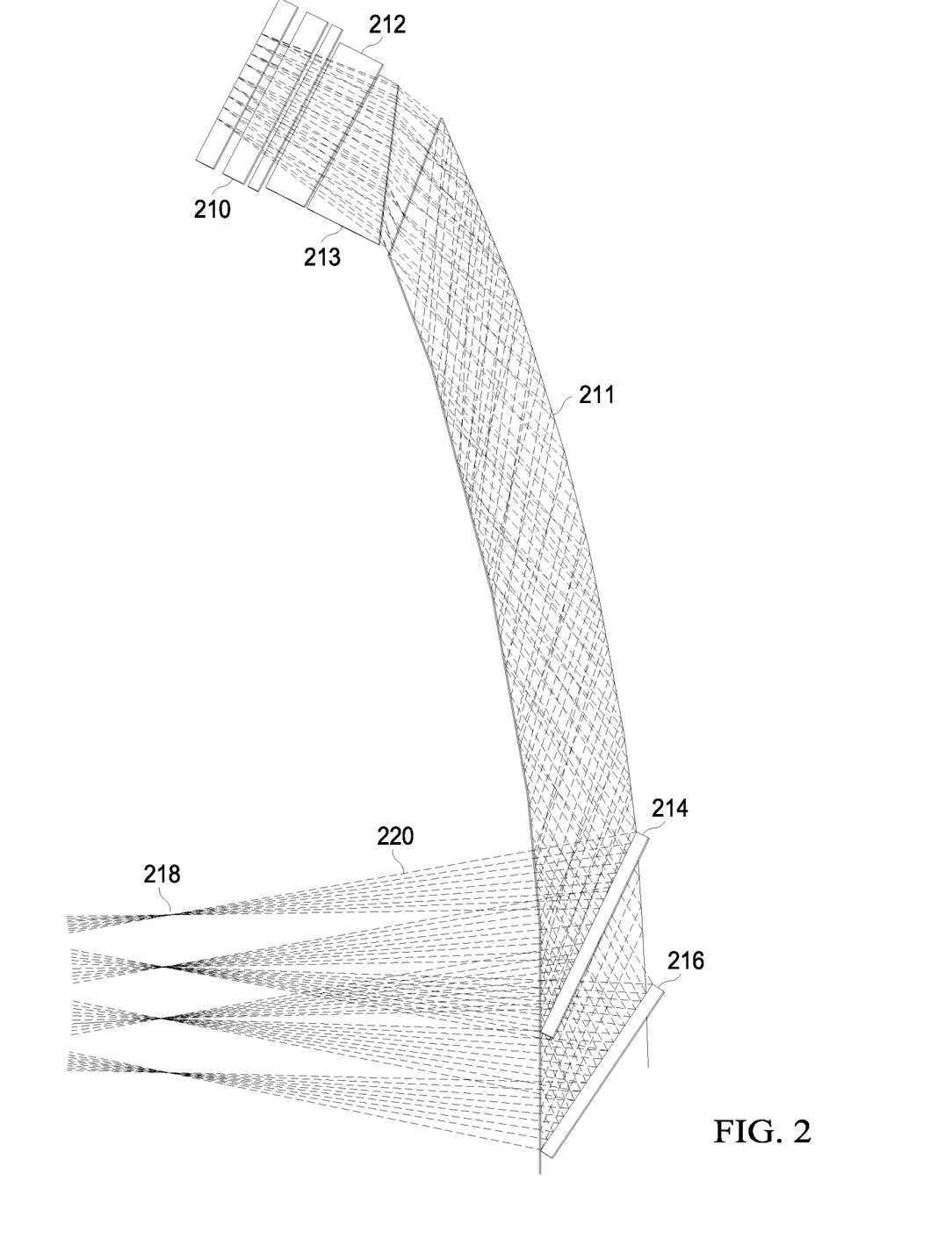
FIG. 2 is a diagram illustrating a portion of the HMD of FIG. 1 including the lightguide having multiple combiners in accordance with some embodiments.

FIG. 2 illustrates an example portion of the HMD 100 including a lightguide 211 in accordance with some embodiments. The lightguide 211 is composed of acrylic, polycarbonate, Zeonex E-48R, EP5000, or other material configured to provide TIR for propagating image light generated by a micro-display 210. In particular, the micro-display 210 generates light based on image frames provided by a graphics processing unit (GPU) or other device (not shown). The HMD 100 includes a prism 213 positioned to couple the light rays generated by the micro-display 210 into the lightguide 211, which propagates the coupled light rays using TIR. The prism 213 color correct the dispersion of the lightguide material, and 2) enhances the telecentricity of the HMD 100. The lightguide 211 emits the propagated light so that the rays of the propagated light converge at or near a position 218, where the user's pupil is expected to be positioned when wearing the HMD 100.

To support display multiple fields of view of the micro-display 210 at the user's pupil, the HMD 100 includes a polarizer switch 212 and a plurality of polarized combiners, designated combiners 214 and 216, respectively. The polarizer switch 212 is disposed between the micro-display 210 and the prism 213 and is generally configured to pass light of a specified polarization based on the state of a received control signal (not shown). Thus, for example, in response to the control signal having a first state, the polarizer switch 212 passes only P-polarized light to the prism 213 and in response to the control signal having a second state, the polarizer switch 212 passes only S-polarized light to the prism 213. In some embodiments, the polarizer switch 212 is a liquid crystal display (LCD) cell and the control signal is a voltage provided by a controller of the HMD 100.

The combiners 214 and 216 are each configured to combine and emit light of having a corresponding polarization. For example, in the embodiment of FIG. 2, the combiner 214 is configured to combine and emit S-polarized light from the lightguide 211, while the combiner 216 is configured to combine and emit P-polarized light from the lightguide 211. In at least one embodiment, each of the combiners 214 and 216 includes one or more beamsplitters arranged and coated with polarization material to combine and emit light having the corresponding polarization. The virtual image distance for one combiner can be different from the other combiner. For example, one combiner can place the virtual image distance 2 meters away from the user, and the second one at 5 meters away from the user.

In operation, a controller of the HMD 100 periodically changes the control signal of the polarizer switch 212, thereby time-multiplexing the provision of light of different polarizations, based on the light emitted by the micro-display 210, to the lightguide 211. For example, in some embodiments, the HMD 100 controls the polarizer switch 212 to alternate provision of P-polarized light emitted from the micro-display 210 with provision of S-polarized light emitted from the micro-display The combiners 214 and 216 combine and provide the light of the corresponding polarization from the lightguide 211 to the user's pupil at position 218, thereby providing two different fields of view of the image displayed at the micro-display 210. By changing the control signal of the polarizer switch 212 at a sufficient rate, the persistence of vision of the user will result in the different fields of view appearing to that user as if they are being displayed simultaneously. Further, and as described further herein, by alternating the frames or other graphical information displayed by the micro-display 210 in synchronization with the provision of light of different polarizations, the HMD 100 can change the user experience. For example, the HMD 100 can support different fields of view displaying different content, different image planes, and the like, or any combination thereof.

Figure 3:
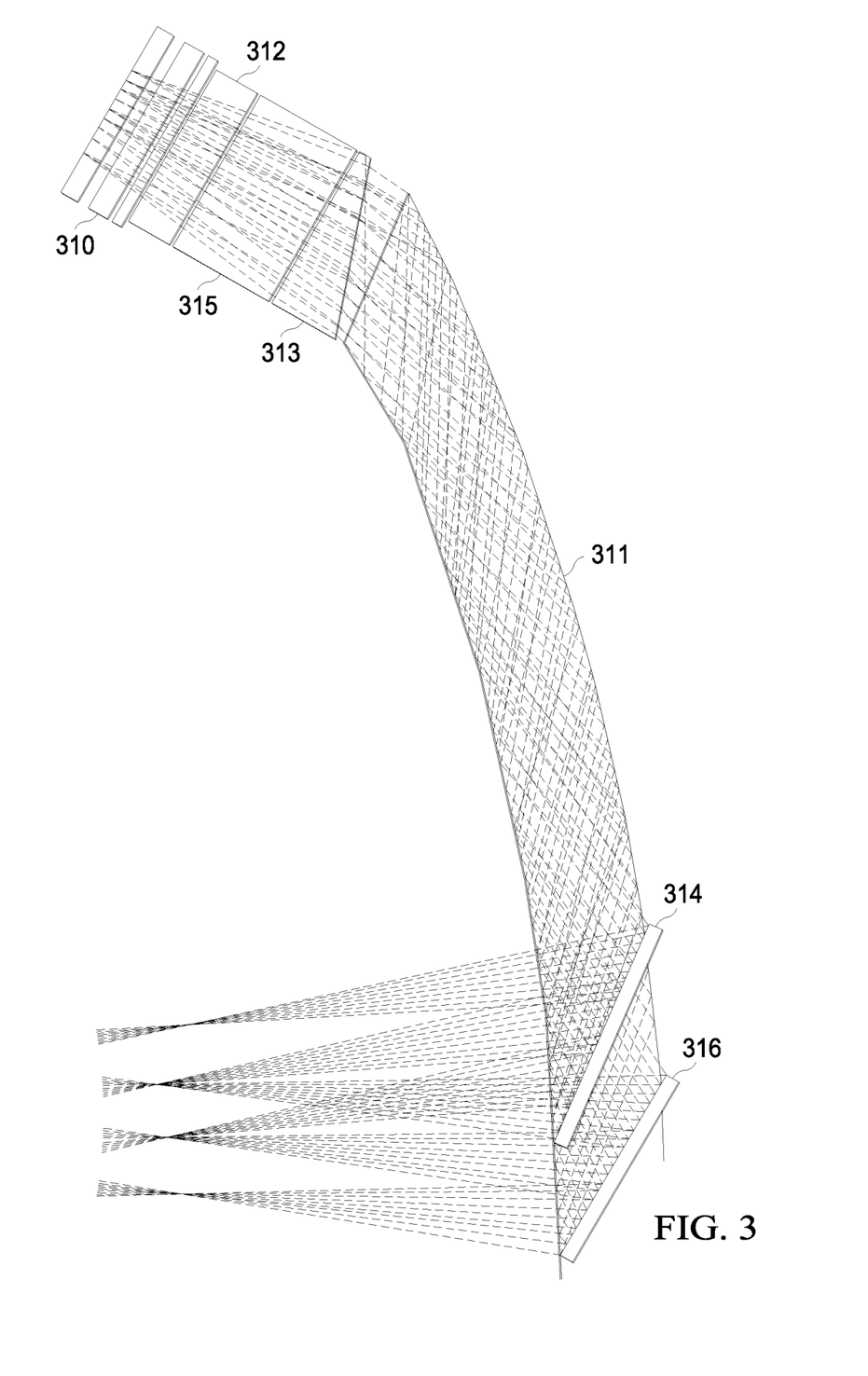
FIG. 3 is a diagram illustrating a portion of the HMD of FIG. 1 including the lightguide having multiple combiners and an angle filter in accordance with some embodiments.

In some embodiments, the HMD 100 can produce unwanted side images. For example, in some embodiments light from the micro-display 310 is coupled to the lightguide 311 via a V-shaped groove to filter rays at high incident angles and allow rays at lower incident angles to pass through. Whether or not a ray passes through an airgap in the V-shaped groove is determined by the incidence angle of the ray and the critical angle for total internal reflection of the V-shaped groove. The critical angle is determined by the materials that are used to fabricate the optical structure. The slopes of the V-shaped groove are adjusted such that only rays that are incident on the surfaces of the V-shaped groove below a certain design incidence angle are allowed to pass. Aligning the filter axis with the linear polarization of the display (for P-polarization incidence) improves efficiency of the filter by reducing Fresnel reflections in the optical structure. However, artifacts are produced in the image by light incident on the "point" of the V-shaped groove, i.e., the region in which the angle of the V-shaped groove changes to form the V-shape. Rays in the fillet can impinge on the point of the V-shaped groove at the wrong reflection angle and are not totally internally reflected, which allows the light to enter the lightguide of the HMD and produce the image artifacts. To mitigate these artifacts, the HMD 100 can include an angle filter. An example is illustrated at FIG. 3 in accordance with some embodiments.

In the depicted example, the HMD 100 includes a micro-display 310, a lightguide 311, a polarizer switch 312, and combiners 314 and 316. Each of these elements is configured to operate similarly as the corresponding elements of FIG. 2. However, in the embodiment of FIG. 3, an angle filter 315 is disposed between the polarizer switch 312 and the prism 313. In some embodiments, the angle filter 315 is implemented using two or three standard prisms deployed in sequence or stack configuration. For example, two prisms can be configured to reject light at high angles by total internal reflection. One of the prisms rejects the light rays that would travel along the one-bounce path to the eye of the user and another prism rejects light rays that would travel along the three-bounce path to the user's eye. The stack of prisms is configured to correct for lateral color and telecentricity at the display.

The three-prism embodiment is used to provide additional degrees of freedom (angles, glass type, etc.) relative to the two-prism embodiment if needed to meet all the design requirements for the HMD. The prisms can be fabricated of glass and standard prisms are relatively inexpensive. The airgap between the prism is large enough that rays cannot cross the gap beyond the TIR angle through coupling by evanescent wave. The gap is kept relatively small to minimize the distance glancing rays travel parallel to the glass surface, which can blur the image. For example, the airgap can be within the range 5-20 microns. If the size of the airgap is below approximately 1 micron, the evanescent wave can couple rays across the airgap even if they have an angle of incidence that is even beyond TIR. Antireflective coatings or polarization films can be used to improve efficiency in some cases.

Figure 4:
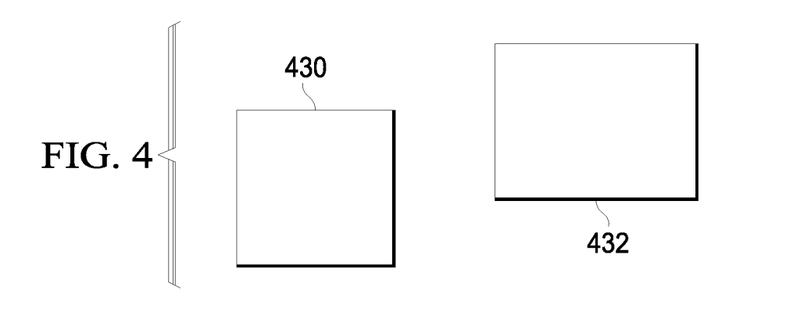
FIG. 4 is a diagram illustrating an example of the HMD of FIG. 1 displaying multiple fields of view in a stitched configuration in accordance with some embodiments.

In different embodiments, the combiners 314 and 316 (or the combiners 214 and 216 of FIG. 2) can be positioned differently to change the positioning of the respective displayed fields of view. For example, in some embodiments, the combiners 314 and 316 are positioned to present the different fields of view in a "split" format, wherein the different fields of view are displayed in an offset fashion. An example is illustrated at FIG. 4 in accordance with some embodiments. In particular, FIG. 4 illustrates two fields of view (FOVs), designated FOV 430 and FOV 432. For purposes of description, it is assumed that the FOV 430 is generated from light provided by the combiner 314 and the FOV 432 is generated from light provided by the combiner 316. The FOVs 430 and 432 are displayed, based on the positioning of the combiners 314 and 316 respectively, in a split format. That is, the FOVs 430 and 432 are displayed as offset from each other, horizontally, vertically, or any combination thereof. In some embodiments, as described further herein, the FOVs 430 and 432 can be individually positioned by a display controller than adjusts the positions of the combiners 314 and 316.

Figure 5:
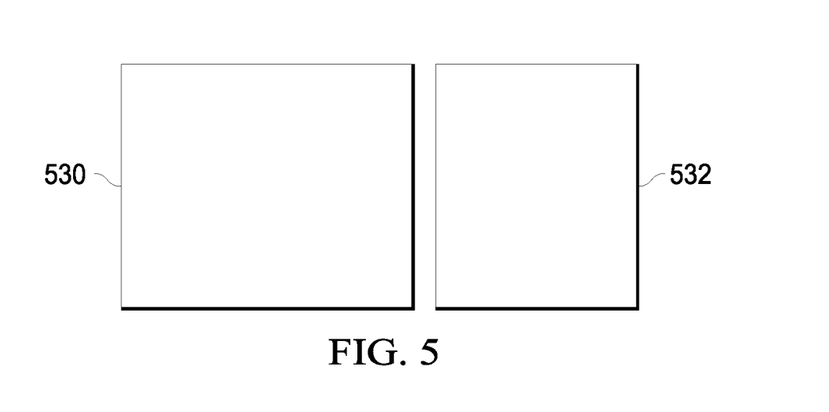
FIG. 5 is a diagram illustrating an example of the HMD of FIG. 1 displaying multiple fields of view in a separated configuration in accordance with some embodiments.

In other embodiments, the combiners 314 and 316 are positioned to display the different fields of view to the user in a "stitched" format, such that the different fields of view are placed in sufficient proximity that they appear to be a single field of view to the user. An example is illustrated at FIG. 5 in accordance with some embodiments. In the depicted example, two fields of view are illustrated, designated FOV 530 and FOV 532. Similar to the embodiment of FIG. 4, it is assumed that the FOV 530 is generated from light provided by the combiner 314 and the FOV 532 is generated from light provided by the combiner 316. The FOVs 530 and 532 are displayed, based on the positioning of the combiners 314 and 316 respectively, in a stitched format. In the depicted embodiment, a small gap is shown between the FOVs 530 and 532 to indicate that the two FOVs are different FOVs and can be offset by a small amount, but the gap is too small to be perceived by the human eye. Thus, the two FOVs 530 and 532 appear to the user as a single FOV.

Figure 6:
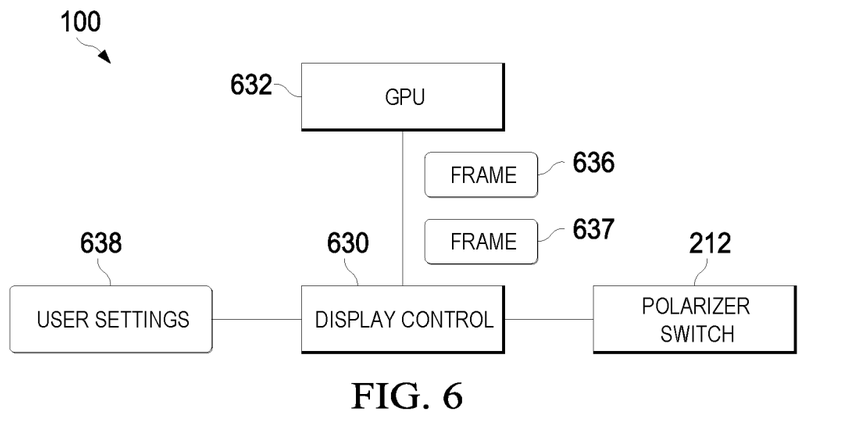
FIG. 6 is a block diagram of the HMD of FIG. 1 including a display system to display content via multiple fields of view in accordance with some embodiments.

FIG. 6 illustrates a block diagram of the HMD 100 of FIG. 1 including a display system to display content via multiple fields of view in accordance with some embodiments. To support display of the multiple FOVs, the HMD 100 includes a display control module 630, a graphics processing unit (GPU) 632, the polarizer switch 212 (FIG. 2). The GPU is generally configured to generate frames (e.g., frames 636 and 637) for display at the HMD 100 based on commands received from another processor (not shown) such as a central processing unit (CPU) of an external device (e.g. a computer or cell phone) or a CPU of the HMD 100. The display control module 630 is generally configured to control operation of the polarizer switch to time multiplex the provision of light of different polarizations to the lightguide 211. In some embodiments, the display control module 630 controls provision of the frames from the GPU 632 to the micro-display 210 and synchronizes provision and display of the frames at the micro-display 210 with control of the polarizer switch 212 so that different frames are displayed at different FOVs. For example, referring to FIG. 4, in some embodiments the display control module synchronizes control of the polarizer switch 212 with provision of the frames such that frame 636 is displayed via FOV 430 and frame 637 is displayed via FOV 432.

By displaying different frames via different FOVs, the HMD 100 supports flexible display of information to the user. For example, in some embodiments the display control module 630 selects the frame to display via each FOV based on a set of user settings 638. The user can adjust the user settings 638 (via, e.g., a graphical user interface (GUI) or other interface so that the display control module displays frames associated with different applications, or different types of information, via different fields of view. For example, in some embodiments the user can adjust the user settings 638 so that a video is displayed via FOV 430 and notification information (e.g. email or chat notifications) are displayed via FOV 432.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) comprising:
a micro-display;
a lightguide;
a plurality of combiners coupled to the lightguide, each of the plurality of combiners to provide light of different polarizations from the lightguide to generate multiple fields of view of the micro-display;
a switch to provide light of different polarizations to the lightguide; and
an angle filter coupled to the switch and a V-shaped groove and disposed between the switch and a prism of the HMD configured to couple light rays generated by the micro-display into the lightguide, wherein the angle filter implements at least two prisms being configured to reject light at high angles by total internal reflection.

2. The HMD of claim 1 wherein the plurality of combiners includes a first combiner to combine P-polarized light and a second combiner to combine S-polarized light.

3. The HMD of claim 2, wherein the switch is to provide light of different polarizations to the lightguide to generate a plurality of fields of view of the micro-display.

4. The HMD of claim 3, wherein the switch is configured to pass light of a specified based on a state of a received control signal.

5. The HMD of claim 4, wherein the received control signal is a voltage provided by a controller of the HMD.

6. The HMD of claim 3, wherein the switch is configured to alternate provision of P-polarized light emitted from the micro-display with provision of S-polarized light emitted from the micro-display and the first and second combiners are configured to provide the light of the corresponding polarization from the lightguide to user's pupil.

7. The HMD of claim 3, wherein the switch comprises a liquid crystal display (LCD) switch.

8. The HMD of claim 3, further comprising a controller to control the switch to time-multiplex the provision of lights of different polarizations to the lightguide.

9. The HMD of claim 1, wherein the plurality of combiners is arranged to present a stitched field of view based on the multiple fields of view.

10. The HMD of claim 1, wherein the plurality of combiners is arranged to present a split field of view based on the multiple fields of view.

11. The HMD of claim 1, further comprising a controller {630} configured to position the plurality of combiners to set the relative positions of the multiple fields of view.

12. The HMD of claim 11, wherein the position of the plurality of combiners is user programmable.

13. A head mounted display (HMD) comprising:
a micro-display;
a lightguide to receive light from the micro-display;
a first combiner coupled to the lightguide and configured to combine light having a first polarization;
a second combiner coupled to the lightguide and configured to combine light having a second polarization different than the first polarization;
a switch coupled to the micro-display to provide light of different polarizations to the lightguide; and
an angle filter coupled to the switch and a V-shaped groove and disposed between the switch and a prism of the HMD configured to couple light rays generated by the micro-display into the lightguide, wherein the angle filter implements at least two prisms being configured to reject light at high angles by total internal reflection.

14. The HMD of claim 13,
wherein the switch is to provide light of different polarizations to the lightguide to generate a plurality of fields of view of the micro-display.

15. A method, comprising:
generating images at a micro-display;
receiving light from the micro-display at a lightguide;
combining, with a plurality of combiners coupled to the lightguide, the received light to provide light of different polarizations from the lightguide to generate multiple fields of view of the micro-display;

controlling a switch coupled to the micro-display to provide light of different polarizations to the lightguide; and angle filtering the light provided by the switch with an angle filter coupled to the switch and a V-shaped groove and disposed between the switch and a prism to couple light rays generated by the micro-display into the lightguide, wherein the angle filter implements at least two prisms configured to reject light at high angles by total internal reflection.

16. The method of claim 15, wherein the plurality of combiners includes a first combiner to combine P-polarized light and a second combiner to combine S-polarized light.

17. The method of claim 15, wherein the switch comprises a liquid crystal display (LCD) switch.

18. The method of claim 15, wherein the plurality of combiners is arranged to present a stitched field of view based on the multiple fields of view.

19. The method of claim 15, wherein the plurality of combiners is arranged to present a split field of view based on the multiple fields of view.

\* \* \* \* \*